(12) United States Patent
Nutt et al.

(10) Patent No.: US 12,117,109 B2
(45) Date of Patent: Oct. 15, 2024

(54) VEHICULAR SMART HOSE SYSTEM FOR DETECTING A CLAMP STATE

(71) Applicant: Ford Global Technologies, LLC, Dearborn, MI (US)

(72) Inventors: David Lloyd Nutt, Monroe, MI (US); Judith Sellars, Canton, MI (US); Jeffrey Paul Luther, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 877 days.

(21) Appl. No.: 17/147,143

(22) Filed: Jan. 12, 2021

(65) Prior Publication Data
US 2022/0221095 A1    Jul. 14, 2022

(51) Int. Cl.
| | | |
|---|---|---|
| *F16L 33/03* | (2006.01) | |
| *B62D 65/00* | (2006.01) | |
| *F16L 3/10* | (2006.01) | |
| *G07C 3/02* | (2006.01) | |

(52) U.S. Cl.
CPC ............ *F16L 33/03* (2013.01); *B62D 65/005* (2013.01); *G07C 3/02* (2013.01); *F16L 2201/10* (2013.01)

(58) Field of Classification Search
CPC .... F16L 33/03; F16L 2201/10; B62D 65/005; G07C 3/02; G07C 5/0841; B60R 16/0215; B60R 16/08
See application file for complete search history.

(56) References Cited

U.S. PATENT DOCUMENTS

| | | | |
|---|---|---|---|
| 9,129,202 B2 | 9/2015 | Kelrich | |
| 9,517,804 B2 | 12/2016 | Perry | |
| 10,522,025 B2 | 12/2019 | Potyrailo et al. | |
| 2010/0326219 A1 | 12/2010 | Nelson et al. | |
| 2015/0137992 A1* | 5/2015 | Potyrailo | A61L 2/24 340/870.07 |
| 2019/0275242 A1 | 9/2019 | Steger et al. | |

FOREIGN PATENT DOCUMENTS

JP          2017174431 A  *  9/2017  ................ F16B 2/10

OTHER PUBLICATIONS

English Translation of "JP-2017174431-A" (Year: 2017).*

* cited by examiner

*Primary Examiner* — Charles R Kasenge
(74) *Attorney, Agent, or Firm* — Burris Law, PLLC

(57) ABSTRACT

A smart hose system includes a hose and a clamp monitor secured to the hose and in proximity to a portion of the hose at which a clamp is to be secured. The clamp monitor is configured to responsively interact with the clamp and includes a signal generator configured to provide a first response to an inquiry signal with the clamp being in a first state and provide a second response with the clamp being in a second state.

20 Claims, 3 Drawing Sheets

VEHICULAR SMART HOSE SYSTEM FOR DETECTING A CLAMP STATE

FIELD

The present disclosure relates to a system and method for securing a vehicular hose via a clamp.

BACKGROUND

The statements in this section merely provide background information related to the present disclosure and may not constitute prior art.

Vehicles generally include multiple hoses for fluidly coupling components. In one form, the hoses are attached and secured via clamps, such as pre-opened constant tension clamps. In the event a hose is not secured, fluid flowing through the hose may begin to leak even after the vehicle has passed various inspections. These and other issues related to installation of hoses within a vehicle are addressed by the present disclosure.

SUMMARY

This section provides a general summary of the disclosure and is not a comprehensive disclosure of its full scope or all of its features.

In one form, the present disclosure is directed to a smart hose system that includes a hose and a clamp monitor secured to the hose in proximity to a portion of the hose at which a clamp is to be secured. The clamp monitor is configured to responsively interact with the clamp and includes a signal generator configured to provide a first response to an inquiry signal with the clamp being in a first state and provide a second response different from the first response with the clamp being in a second state.

In one variation, in response to the inquiry signal, the clamp monitor is configured to transmit a first reply signal with the clamp in the first state, as the first response, and transmit a second reply signal different from the first reply signal with the clamp in the second state, as the second response.

In another variation, each of the first reply signal and the second reply signal provides identification data related to the smart hose system.

In yet another variation, the clamp monitor includes a clamp interface portion communicably coupled to the signal generator and configured to interface with the clamp to detect a state of the clamp.

In one variation, the clamp interface portion is adapted to secure to the clamp. With the clamp in the first state, the clamp interface portion is coupled to the signal generator, and with the clamp in the second state, the clamp interface portion is physically altered to be decoupled from the signal generator.

In another variation, the clamp interface portion is secured to the hose and positionally aligns with a portion of the hose at which the clamp is to be arranged. With the clamp in the first state, a gap is provided between the clamp interface portion and the clamp, and the clamp monitor is configured to transmit a first reply signal, as the first response. With the clamp in the second state, the clamp interface portion is in contact with the clamp and the clamp monitor is configured to transmit a second reply signal different from the first reply signal, as the second response.

In yet another variation, the clamp interface portion is a discrete device.

In one variation, the clamp interface portion is integrated with the hose.

In another variation, the clamp monitor employs radio-frequency identification.

In yet another variation, the smart hose system further includes a clamp disposed at the hose, where the clamp is in an open position in the first state and a closed position in the second state.

In one variation, the present disclosure provides for a system that includes the smart hose system and a clamp state analyzer configured to transmit the inquiry signal to determine the clamp state. The clamp monitor is configured to transmit a first reply signal with the clamp in the first state, as the first response, and transmit a second reply signal different from the first reply signal with the clamp in the second state, as the second response. The clamp state analyzer is configured to issue a first notification in response to receiving the first reply signal.

In one form, the present disclosure is directed toward a method of detecting a state of a clamp. The method includes providing a clamp monitor secured to a hose. The clamp monitor includes a signal generator. The clamp monitor is secured in proximity to a portion of the hose at which a clamp is to be disposed and configured to responsively interact with the clamp. The method further includes issuing, by the clamp monitor, a first response to an inquiry signal when the clamp is in a first state, and issuing, by the clamp monitor, a second response to the inquiry signal when the clamp is in a second state.

In one variation, the method further includes transmitting, by the clamp monitor, a first reply signal, as the first response, with the clamp in the first state, and transmitting, by the clamp monitor, a second reply signal different from the first reply signal, as the second response, with the clamp in the second state.

In another variation, the clamp monitor includes a clamp interface portion coupled to the signal generator, and the method further includes having the clamp interface portion secured to the clamp to detect a state of the clamp. With the clamp in the first state, the clamp interface portion remains coupled to the signal generator to transmit the first reply signal, and with the clamp in the second state, the clamp interface portion is physically altered to be decoupled from the signal generator such to transmit the second reply signal.

In yet another variation, the clamp monitor includes a clamp interface portion coupled to the signal generator, and the method further includes having the clamp interface portion secured to the hose and positionally aligned with the portion of the hose at which the clamp is arranged. With the clamp in the first state, a gap is defined between the clamp interface portion and the clamp, and the clamp monitor is configured to transmit the first reply signal in response to the inquiry signal. With the clamp in the second state, the clamp interface portion is in contact with the clamp and the clamp monitor is configured to transmit the second reply signal in response to the inquiry signal.

In one variation, the method further includes transmitting, by a clamp state analyzer, the inquiry signal, transmitting, by the clamp monitor, a first reply signal, as the first response, upon receiving the inquiry signal and with the clamp in the first state, and issuing, by the clamp state analyzer, a notification indicating that the clamp is in the first state in response to the first reply signal.

In another variation, the clamp is in an open position in the first state and in a closed position in the second state.

In one form, the present disclosure is directed toward a smart hose system including a hose, a clamp to be positioned at the hose, and a clamp monitor. The clamp can be set in a first state or a second state. The clamp monitor is secured to the hose in proximity to a portion of the hose having the clamp. The clamp monitor is configured to responsively interact with the clamp, and includes a signal generator and a clamp interface portion. The signal generator is configured to generate a first reply signal with the clamp being in the first state and a second reply signal different from the first reply signal with the clamp in the second state. The clamp interface portion is coupled to the signal generator and configured to interface with the clamp to detect a position of the clamp.

In one variation, the clamp interface portion is secured to the clamp. With the clamp in the first state, the clamp interface portion remains coupled to the signal generator such that the signal generator generates the first reply signal. With the clamp in the second state, the clamp interface portion is physically altered to be decoupled from the signal generator such that the signal generator generates the second reply signal.

In another variation, the clamp interface portion is secured to the hose and positionally aligns with the clamp. With the clamp in the first state, a gap is provided between the clamp interface portion and the clamp, and the clamp monitor is configured to transmit the first reply signal. With the clamp in the second state, the clamp interface portion is in contact with the clamp, and the clamp monitor is configured to transmit a second reply signal different from the first reply signal.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
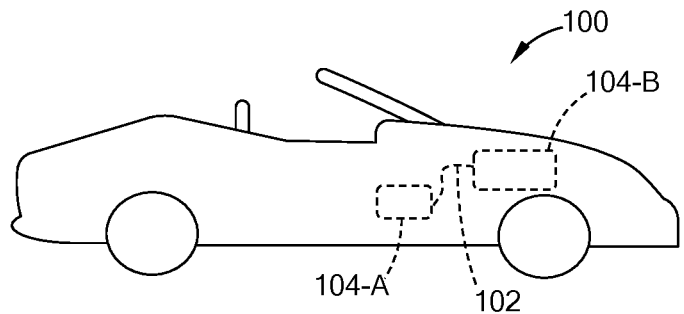
FIG. 1 illustrates a vehicle having a smart hose system disposed between two components in accordance with the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
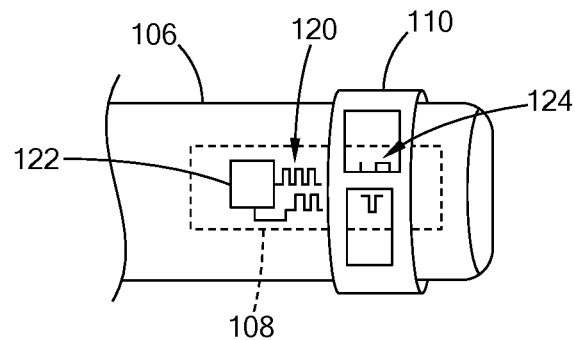
FIG. 2 illustrates the smart hose system in accordance with the present disclosure.
Figure 3:
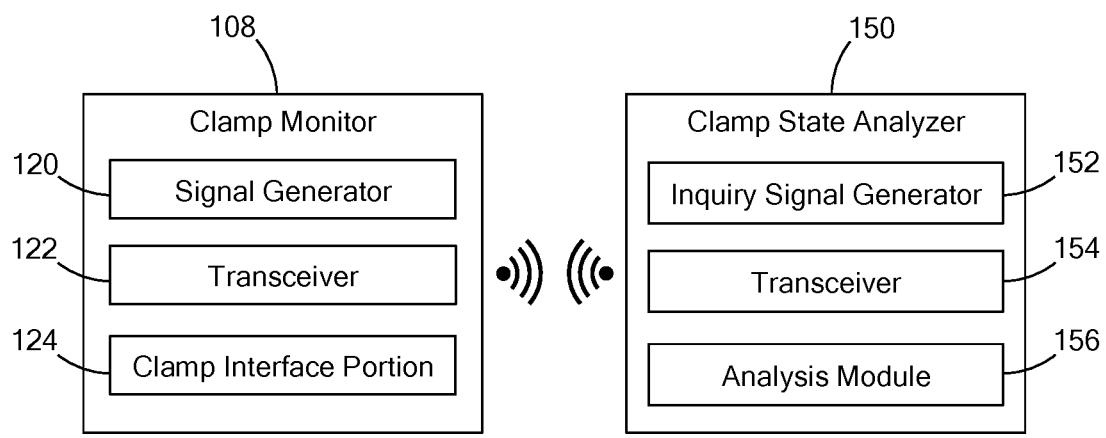
FIG. 3 is a block diagram of the smart hose system and a clamp system analyzer in accordance with the present disclosure.

Referring to FIGS. 1-3, an exemplary vehicle 100 include at least one smart hose system 102 for transporting fluid (e.g., gas, liquid) between vehicular components 104-A and 104-B. In one form, the smart hose system 102 that includes a hose 106, a clamp monitor 108, and a clamp 110 controllable in a first state or a second state. Non-limiting examples of the hose 106 include radiator hoses and heater hoses.

The clamp monitor 108 is secured to the hose 106 in proximity to a portion of the hose 106 at which the clamp 110 is to be secured. For example, the clamp monitor 108 may be provided in proximity to an end portion of the hose 106. In a non-limiting example, the clamp 110 is a constant tension clamp.

The clamp monitor 108 is configured to responsively interact with the clamp 110 to detect a state of the clamp 110. More particularly, in one form, the clamp monitor 108 is configured to provide a first response when the clamp 110 is in a first state (e.g., an open position) and a second response when the clamp 110 is in a second state (e.g., a closed position), where the second response is different from the first response.

In one form, the clamp monitor 108 includes a signal generator 120 to provide the first response and the second response based on the state of the clamp 110. For example, the clamp monitor 108 may employ radio-frequency identification (RFID) technology and is configured as a passive RFID device such that the signal generator 120 is provided as the antenna to receive and emit RF signals. The signal generator 120 is configured to generate a first reply signal (e.g., a first RF wireless signal) as the first response when the clamp 110 is in a first state and a second reply signal (e.g., a second RF wireless signal) when the clamp 110 is in the second state. It should be readily understood that other suitable wireless protocols may be employed by the clamp monitor 108, and the clamp monitor 108 should not be limited to RFID technology.

In one form, the clamp monitor 108 further includes a signal processor 122 and a clamp interface portion 124 coupled to the signal generator 120. The signal processor 122 is configured to process wireless signals received and to be transmitted based on a communication protocol being employed with the smart hose system 102. For example, using RFID technology, the signal processor 122 is a RFID microchip that processes radio frequency signals.

In one form. the clamp interface portion 124 is configured to interface with the clamp 110 to detect a state of the clamp 110. More particularly, in an exemplary application, the clamp interface portion 124 is secured to the clamp 110. With the clamp 110 in the first state, the clamp interface portion 124 is coupled to the signal generator 120 to form part of the signal generator 120 such that the signal generator 120 generates the first reply signal. With the clamp 110 in the second state, the clamp interface portion 124 is physically altered to be decoupled from the signal generator 120 such that the signal generator 120 generates a second reply signal different from the first reply signal.

Figure 4B:
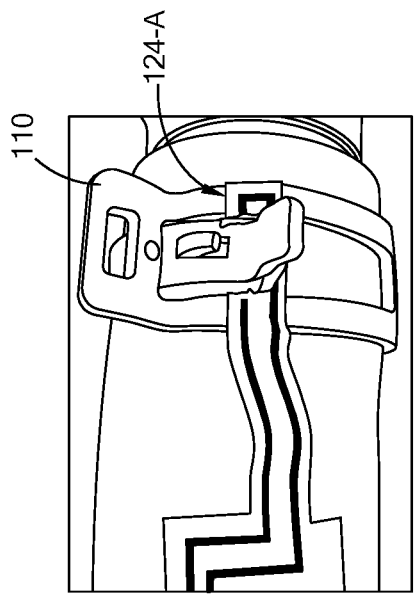
FIG. 4B illustrates the smart hose system of FIG. 4A with the clamp in a second state.
Figure 4A:
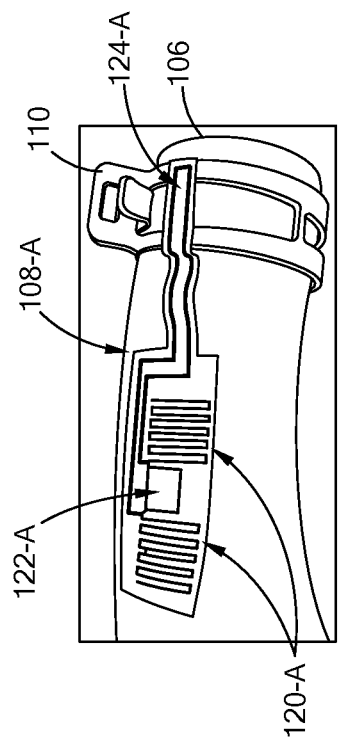
FIG. 4A illustrates a smart hose system in which a clamp interface portion of the smart hose system is provided on a clamp with the clamp in a first state in accordance with the present disclosure.

In a non-limiting example, FIGS. 4A and 4B illustrate a clamp monitor 108-A having a signal generator 120-A, a signal processor 122-A, and a clamp interface portion 124-A. The clamp monitor 108-A is secured to the hose 106 with the clamp interface portion 124-A secured to the clamp 110. The clamp interface portion 124-A and the signal generator 120-A form a closed circuit such that with the clamp 110 in the first state (open position) the signal generator 120 generates the first reply signal (FIG. 4A). When the clamp 110 is in the second state (i.e., closed position), the clamp 110 physically changes the clamp interface portion 124-A such that the clamp interface portion 124-A is decoupled from the signal generator 120-A forming an open circuit that generates the second reply signal different from the first reply signal (FIG. 4B). Accordingly, the clamp monitor 108-A transmits a response indicative of the state of the clamp 110.

In another application, the clamp interface portion 124 is secured to the hose 106 and positionally aligns with a portion of the hose 106 at which the clamp 110 is to be arranged. With the clamp 110 in the first state, a gap is provided between the clamp interface portion 124 and the clamp 110, and the clamp monitor 108 is configured to transmit the first reply signal, as the first response. With the clamp 110 in the second state, the clamp 110 contacts the clamp interface portion 124, and the clamp monitor 108 is configured to transmit the second reply signal different from the first reply signal, as the second response.

Figure 5B:
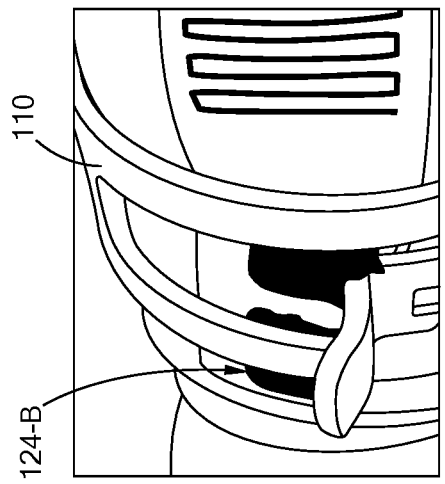
FIG. 5B illustrates the smart hose system of FIG. 5A with the clamp in a second state.
Figure 5A:
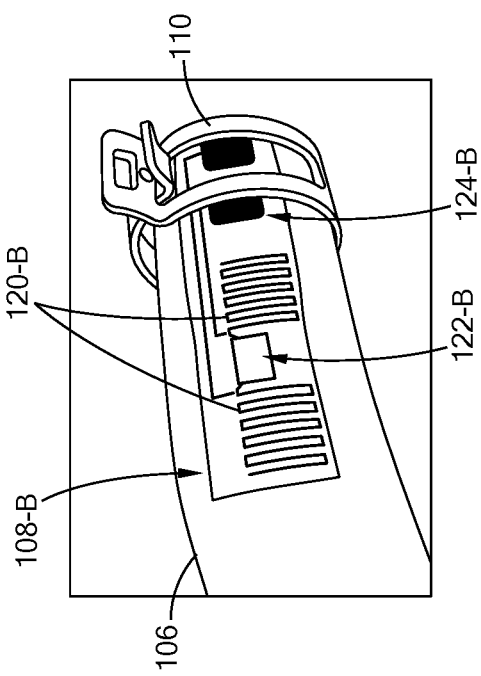
FIG. 5A illustrates a smart hose system in which a clamp interface portion of the smart hose system is provided on a hose with the clamp in a first state in accordance with the present disclosure.

Specifically, in a non-limiting example, FIGS. 5A and 5B illustrate a clamp monitor 108-B that includes a signal generator 120-B, a signal processor 122-B, and a clamp interface portion 124-B. The clamp interface portion 124-B is secured to the hose 106 and forms an open circuit with the signal generator 120-B such that when the clamp 110 is not in contact with the clamp interface portion 124-B, the signal generator 120-B is configured to generate the first reply signal (FIG. 5A). When the clamp 110 contacts the clamp interface portion 124-B (e.g., at least one of two pad portions or other portion of the clamp interface portion 124-B), a closed circuit is formed between the signal generator 120-B and the clamp interface portion 124-B such that signal generator 120-B generates the second reply signal different from the first reply signal (FIG. 5B). Accordingly, the clamp monitor 108-B transmits a response indicative of the state of the clamp 110. In this example, the clamp monitor 108-A is fully secured to the hose 106 such that it could be employed again.

In one form, the clamp monitor 108 is provided as a discrete device secured to the hose 106 and, in some applications, is also secured to the clamp 110. In another form, the clamp monitor 108 is integrated with or into the hose 106. In yet another form, the clamp monitor 108 is provided as a combination of discrete parts integrated with the hose 106. For example, the signal processor 122 may be a discrete chip and the signal generator 120, and the clamp interface portion 124 may be printed onto the hose 106 with the signal generator 120 coupled to the signal processor 122. While specific examples are provided, the clamp monitor 108 may be formed in other suitable ways and should not be limited to the examples provided herein.

Referring back to FIG. 3, the smart hose system 102 is configured detect a state of the clamp 110 and transmit a response indicative of the state to an external device. In exemplary application, the external device is a clamp state analyzer 150 that is configured to transmit an inquiry signal and determine the state of the clamp 110 based on the response received from the smart hose system 102. Specifically, in one form, the clamp state analyzer 150 includes an inquiry signal generator 152, a transceiver 154, and an analysis module 156. The inquiry signal generator 152 is configured to generate an inquiry signal such as a wireless RF based signal.

The transceiver 154 is configured to receive and transmit wireless signals based on a communication protocol being employed by the smart hose system 102. Accordingly, the transceiver 154 is configured to transmit the inquiry signal and receive the reply signal from the smart hose system 102.

The analysis module 156 is configured to analyze the reply signal from the smart hose system 102 to determine the state of the clamp 110. In one form, the analysis module 156 is configured to associate signals similar to or matching that of the first reply signal to a first state of the clamp 110 and associate signals similar to or matching that of the second reply signal to a second state of the clamp 110. Based on the state of the clamp 110, the analysis module 156 is configured to issue a notification and more particularly, issues a first notification in response to receiving the first reply signal and a second notification different from the first notification in response receiving the second reply signal. In one form, the analysis module 156 is configured to provide a notification for when the clamp 110 is in the open position, and not when the clamp 110 is in the closed position. Accordingly, it should be readily understood that analysis module 156 may be configured in various suitable ways and should not be limited to the examples provided herein. The notification issued by the analysis module 156 may be provided via a user interface such as, but not limited to, visual indicators such as monitors, lights and/or audio notification via speakers.

Figure 6:
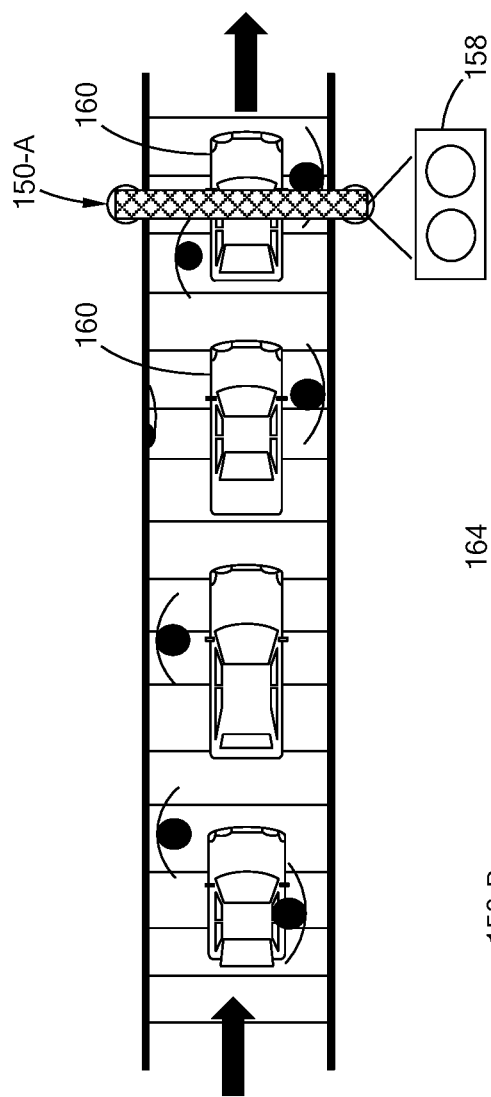
FIG. 6 is one form of the clamp state analyzer as a fixed signal reader in accordance with the present disclosure.

In one exemplary application, FIG. 6 illustrates the clamp state analyzer 150 as a fixed signal reader 150-A having a light indicator 158. The fixed signal reader 150-A includes the inquiry signal generator 152, the transceiver 154, and the analysis module 156 (FIG. 3). Based on the state of the clamp 110, the analysis module 156 operates the light indicator to notify an operator of the state of the clamp 110 in a vehicle. For instance, the light indicator 158 may illuminate a green light when the clamp 110 is in a closed position (e.g., second state) and a red light when the clamp 110 is in an open position (e.g., first state).

Accordingly, in the example of FIG. 6, vehicles 160 having the smart hose system 102 of the present disclosure travel in proximity to the fixed signal reader 150-A, which transmits the inquiry signal. Based on the state of the clamp 110, the smart hose system 102 transmits a response (e.g., a first reply signal or a second reply signal). The fixed signal reader 150-A receives and analyzes the reply signal to determine a state of the clamp 110 and illuminates the green light if the clamp 110 is in closed position and the red light if the clamp 110 is in the open position.

Figure 7:
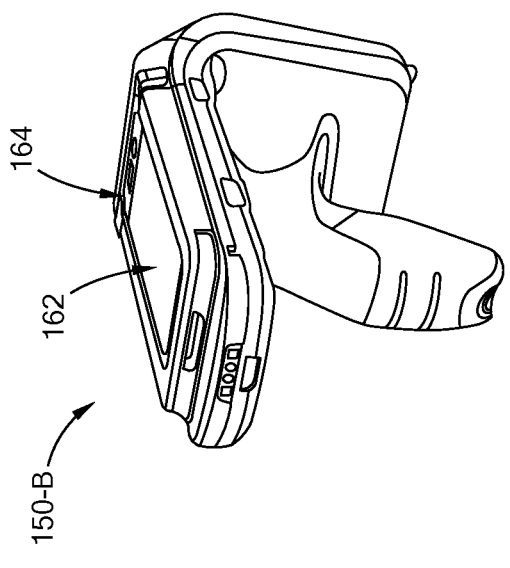
FIG. 7 is another form of the clamp state analyzer as a portable signal reader in accordance with the present disclosure.

In another example, and with reference to FIG. 7, the clamp state analyzer 150 is provided as a portable signal reader 150-B having a display 162 and speaker 164 for notifying a user of the state of the clamp 110. In one form, the display 162 is configured to provide textual information and/or illuminate different colors to indicate the state of the clamp 110, and the speaker 164 is configured to emit different audio sounds to indicate the state of the clamp 110. Like the fixed signal reader 150-A, the portable signal reader 150-B includes the inquiry signal generator 152, the transceiver 154, and the analysis module 156. In one form, with the smart hose system 102 in communication range, the portable signal reader 150-B is operable by a user to transmit the inquiry signal and analyze the response from the smart hose system 102. Using the display and/or the speaker, the analysis module 156 issues a notification indicative of the state of the clamp 110.

While specific examples of the clamp state analyzer 150 is provided, the analyzer 150 can take various suitable forms and should not be limited the examples provided herein. In addition, the notification(s) issued by the clamp state analyzer 150 may take various suitable forms and should not be limited to the examples provided herein. For example, the notification may be transmitted to a computing device located at a different location than that of the clamp state analyzer 150, such as a workstation.

In one form, the clamp monitor 108 is configured to provide identification data related to the smart hose system 102 with the first/second responses. That is, in one form, the identification data, which can be stored in the signal processor 122, may be an alphanumeric code indicative of the location of the smart hose system 102 or other suitable identification to locate the smart hose system 102 within the vehicle. For example, the first reply signal and the second reply signal from the signal generator 120 include the identification data that can be decoded by the analysis module 156 of the clamp state analyzer 150. Accordingly, the smart hose system 102 within a vehicle can be distinguished and more particularly, located when the clamp 110 of an installed smart hose system 102 is determined to be in the open state.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A smart hose system comprising:
   a hose; and
   a clamp monitor configured to responsively interact with a separately disposed clamp, wherein the clamp monitor is secured to the hose in proximity to a portion of the hose at which the clamp is to be secured, and wherein the clamp monitor includes:
      a signal generator configured to provide a first response to an inquiry signal with the clamp being in a first state and provide a second response different from the first response with the clamp being in a second state, and
      a clamp interface portion communicably coupled to the signal generator and configured to interface with the clamp to detect a state of the clamp, wherein:
         the clamp interface portion is secured to the hose and positionally aligns with a portion of the hose at which the clamp is to be arranged,
         with the clamp in the first state, a gap is provided between the clamp interface portion and the clamp, and the clamp monitor is configured to transmit a first reply signal, as the first response, and
         with the clamp in the second state, the clamp interface portion is in contact with the clamp and the clamp monitor is configured to transmit a second reply signal different from the first reply signal, as the second response.

2. The smart hose system of claim 1, wherein, in response to the inquiry signal, the clamp monitor is configured to:
   transmit a first reply signal with the clamp in the first state, as the first response, and
   transmit a second reply signal different from the first reply signal with the clamp in the second state, as the second response.

3. The smart hose system of claim 2, wherein each of the first reply signal and the second reply signal provides identification data related to the smart hose system.

4. The smart hose system of claim 3, wherein the smart hose system further comprises a clamp state analyzer configured to:
   decode the identification data; and
   determine a location of the smart hose system within a vehicle based on the decoded identification data.

5. The smart hose system of claim 1, wherein:
   the clamp interface portion is adapted to secure to the clamp,
   with the clamp in the first state, the clamp interface portion is coupled to the signal generator, and with the clamp in the second state, the clamp interface portion is physically altered to be decoupled from the signal generator.

6. The smart hose system of claim 1, wherein the clamp interface portion is a discrete device.

7. The smart hose system of claim 1, wherein the clamp interface portion is integrated with the hose.

8. The smart hose system of claim 1, wherein the clamp monitor employs radio-frequency identification.

9. The smart hose system of claim 1 further comprising a clamp disposed at the hose, wherein the clamp is in an open position in the first state and a closed position in the second state.

10. A system comprising:
the smart hose system of claim 1; and
a clamp state analyzer configured to transmit the inquiry signal to determine the clamp state, wherein
the clamp monitor is configured to transmit a first reply signal with the clamp in the first state, as the first response, and transmit a second reply signal different from the first reply signal with the clamp in the second state, as the second response, and
the clamp state analyzer is configured to issue a first notification in response to receiving the first reply signal.

11. The smart hose system of claim 1, wherein the smart hose system further comprises a clamp state analyzer configured to:
transmit a notification indicative of the state of the clamp via a display screen, a speaker, or a combination thereof.

12. The smart hose system of claim 1, wherein each of the first reply signal and the second reply signal include identification data indicative of a location of the smart hose system within a vehicle.

13. A method of detecting a state of a clamp, the method comprising:
providing a clamp monitor configured to responsively interact with a separately disposed clamp, wherein the clamp monitor includes a clamp interface portion coupled to a signal generator, and wherein the clamp monitor is secured to a hose in proximity to a portion of the hose at which the clamp is to be secured, and further wherein the clamp interface portion is secured to the hose and is positionally aligned with the portion of the hose at which the clamp is arranged;
issuing, by the clamp monitor, a first response to an inquiry signal when the clamp is in a first state;
issuing, by the clamp monitor, a second response to the inquiry signal when the clamp is in a second state;
transmitting, by the clamp monitor, a first reply signal, as the first response, with the clamp in the first state, wherein with the clamp in the first state, a gap is defined between the clamp interface portion and the clamp, and the clamp monitor is configured to transmit the first reply signal in response to the inquiry signal; and
transmitting, by the clamp monitor, a second reply signal different from the first reply signal, as the second response, with the clamp in the second state, wherein with the clamp in the second state, the clamp interface portion is in contact with the clamp and the clamp monitor is configured to transmit the second reply signal in response to the inquiry signal.

14. The method of claim 13, wherein the clamp monitor includes a clamp interface portion coupled to the signal generator, the method further comprises:
having the clamp interface portion secured to the clamp to detect a state of the clamp, wherein:
with the clamp in the first state, the clamp interface portion remains coupled to the signal generator to transmit the first reply signal, and
with the clamp in the second state, the clamp interface portion is physically altered to be decoupled from the signal generator such to transmit the second reply signal.

15. The method of claim 13 further comprising:
transmitting, by a clamp state analyzer, the inquiry signal;
transmitting, by the clamp monitor, a first reply signal, as the first response, upon receiving the inquiry signal and with the clamp in the first state; and
issuing, by the clamp state analyzer, a notification indicating that the clamp is in the first state in response to the first reply signal.

16. The method of claim 13, wherein the clamp is in an open position in the first state and in a closed position in the second state.

17. The method of claim 13, further comprising:
transmitting a notification indicative of the state of the clamp via a display screen, a speaker, or a combination thereof.

18. The method of claim 13, wherein each of the first reply signal and the second reply signal include identification data indicative of a location of a smart hose system within a vehicle.

19. A smart hose system comprising:
a hose;
a clamp to be positioned at the hose, wherein the clamp can be set in a first state or a second state; and
a clamp monitor configured to responsively interact with a separately disposed clamp, wherein the clamp monitor is secured to the hose in proximity to a portion of the hose at which the clamp is to be secured and includes:
a signal generator configured to generate a first reply signal with the clamp being in an open position and a second reply signal different from the first reply signal with the clamp in a closed position, and
a clamp interface portion coupled to the signal generator and configured to interface with the clamp to detect a position of the clamp, wherein:
the clamp interface portion is secured to the hose and positionally aligns with the clamp,
with the clamp in the first state, a gap is provided between the clamp interface portion and the clamp, and the clamp monitor is configured to transmit the first reply signal, and
with the clamp in the second state, the clamp interface portion is in contact with the clamp and the clamp monitor is configured to transmit a second reply signal different from the first reply signal.

20. The smart hose system of claim 19, wherein:
the clamp interface portion is secured to the clamp,
with the clamp in the first state, the clamp interface portion remains coupled to the signal generator such that the signal generator generates the first reply signal, and
with the clamp in the second state, the clamp interface portion is physically altered to be decoupled from the signal generator such that the signal generator generates the second reply signal.

* * * * *